United States Patent
Campi et al.

(10) Patent No.: US 8,756,156 B1
(45) Date of Patent: Jun. 17, 2014

(54) ONLINE MANAGEMENT PORTAL

(71) Applicant: HouseTab, LLC, New York, NY (US)

(72) Inventors: Patrick G. Campi, New York, NY (US); Nikolaos Plaitakis, South Orange, NJ (US); Andrew Tauber, New York, NY (US)

(73) Assignee: HouseTab, LLC, New York, NY (US)

( * ) Notice: Subject to any disclaimer, the term of this patent is extended or adjusted under 35 U.S.C. 154(b) by 0 days.

(21) Appl. No.: 14/192,842

(22) Filed: Feb. 27, 2014

Related U.S. Application Data

(60) Provisional application No. 61/769,904, filed on Feb. 27, 2013.

(51) Int. Cl.
  *G06Q 40/00* (2012.01)
  *G06Q 20/08* (2012.01)
(52) U.S. Cl.
  CPC .................................. *G06Q 20/085* (2013.01)
  USPC .......................................................... 705/40
(58) Field of Classification Search
  CPC .................................................... G06Q 20/085
  USPC .......................................................... 705/40
  See application file for complete search history.

(56) References Cited

U.S. PATENT DOCUMENTS 8,630,921 B2 * 1/2014 Nuzzi et al. .................. 705/27.1
8,634,523 B2 * 1/2014 Williams et al. ........... 379/93.25

OTHER PUBLICATIONS

Anonymous. Business Wire; "ideaEDGE Secures IP for Online Group Gift Cards and eCards"; New York; Apr. 8, 2008.*
Canada NewsWire; "FlipGive Gets Funded to Revolutionize Digital Marketing whlie Doing Good"; Sep. 25, 2012.*

* cited by examiner

*Primary Examiner* — Edward Chang
(74) *Attorney, Agent, or Firm* — Perkins Coie LLP

(57) ABSTRACT

Methods, systems and computer program products of an online management portal which manages business and social activities among merchants and users in an online environment. During a user's visit of a merchant's establishment, the online management portal enables participants to check the user into the merchant's establishment, open a tab on the merchant, request for a check for the tab, and pay the tab with mobile electronic devices. In general, the online management portal also allows users to engage in online chatting, posting, sending and receiving orders of merchant products, and other social activities with their mobile electronic devices.

20 Claims, 18 Drawing Sheets

Accounts Database 202

| |
|---|
| Participant ID |
| User name 301 |
| Password 302 |
| Name |
| Nickname |
| Picture |
| Physical address |
| Email address |
| Phone number |
| Birth/creation date |
| Active/operating hours |
| Payment system credential 303 |
| Terms of service 304 |
| Favorites |
| Role 306 |
| Buddies 307 |
| Privacy settings 308 |
| Chips 309 |

*FIG. 3*

Offerings Database 203

| Offering ID |
| --- |
| Description |
| Merchant ID |
| Regular Price |
| Deal price 401 |
| Deal end date 402 |
| Quantity |

*FIG. 4*

Locations Database 204

| Location ID 501 |
| --- |
| User ID |
| Merchant ID |
| Entry date and time |
| Departure date and time |

*FIG. 5*

Tabs Database 205

| Tab ID |
| --- |
| User ID |
| Merchant ID |
| State (opening-requested, opened, closing-requested, paid, closed, insufficient-fund, walked-out) 601 |
| Total |
| Tax |
| Tip |
| Open Date 605 |
| Close Date 610 |
| Server |
| Table |

*FIG. 6*

Orders Database 206

| Offer ID |
| --- |
| Tab ID 704 |
| Offering ID |
| Recipient ID 706 |
| Price |
| Placement Date 708 |
| Redemption Date 710 |

*FIG. 7*

Chats Database 211

| ID |
|---|
| Sender 805 |
| List of Recipients 810 |
| Time Stamp |
| Content |

*FIG. 8*

Buzz Database 212

| ID |
|---|
| Reference 905 |
| Author |
| Time Stamp |
| Content |
| Permissions 910 |

*FIG. 9*

ONLINE MANAGEMENT PORTAL

CROSS-REFERENCE TO RELATED APPLICATION

The present application claims priority to and benefit from U.S. Provisional Patent Application No. 61/769,904 titled "Merchant Portal" filed on Feb. 27, 2013, the entire content of which is herein expressly incorporated by reference.

TECHNICAL FIELD

Various embodiments of the present invention generally relate to systems and methods for online financial transactions and social networking. More specifically, some embodiments of the present invention relate to managing transactions and interactions among merchants and users or potential customers.

BACKGROUND

With the prevalence of online tools, people communicate more substantially and efficiently. It would be helpful to streamline financial transactions in social networking environments, to maximize the effectiveness of networking while minimizing the effort devoted to financial administration.

SUMMARY OF THE INVENTION

The disclosed embodiments relate to methods, systems and computer program products of an online management portal that enables merchants and users to conduct financial transactions while engaging in social activities using electronic devices, such as mobile phones or tablets.

During a user's visit of a merchant's establishment, the online management portal enables participants to check the user into the merchant's establishment, open a tab on the merchant, request a check for the tab, and pay for the tab with mobile electronic devices. In general, the online management portal also allows users to engage in online chatting, posting, sending and receiving orders of merchant products, and other social activities with their mobile electronic devices. The merchant products may include food, drinks or other consumables.

In some embodiments, a device for managing business and social activities for a user in an online environment in which a plurality of users and merchants participate is disclosed. The device comprises a logging unit configured to log into or out of the online environment, and a checking unit configured to check into or out of an establishment of a merchant who is logged into the online environment. It also comprises a tab opening unit configured to ask, via mobile device, for a tab to be initiated, a check handling unit configured to request and receive a check for the tab, and a payment unit configured to specify a method of payment. In addition, the device comprises a user listing unit configured to obtain a list of users who are checked into the merchant's establishment and another list of users who are logged into the online environment, and a gift unit configured to send and receive an order of a product of the merchant to one of the list of users who are checked into the merchant's establishment. The gift unit may be further configured to send and receive an order to one of the list of users designated as the user's buddies regardless of where the buddies are located.

In some embodiments, a device for managing business and social activities for a merchant in an online environment in which a plurality of merchants and users participate is disclosed. The device comprises a logging unit configured to log into or out of the online environment, and a checking unit configured to receive a notification that a user has checked into or out of the merchant's establishment. It also comprises a user listing unit configured to obtain a list of users who are checked into the merchant's establishment and another list of users who are logged into the online environment, and a marketing unit configured to send a marketing message to either list of users. In addition, the device comprises a tab opening unit configured to open a tab for the user, a check handling unit configured to request and receive a check for the tab, and a payment processing unit configured to receive a notification of a result of processing the user's payment for the tab. Furthermore, it comprises a gift unit configured to receive notifications that the user has accepted an order sent by another user of a product of the merchant.

In some embodiments, a method performed by an online management portal of managing business and social activities among merchants and users in an online environment is disclosed. The method comprises checking a user into or out of a merchant's establishment, sending a request to open a tab from the user to the merchant, and opening a tab on the merchant for the user. It also comprises generating a check for the tab, delivering the generated check to the user and the merchant, processing the user's payment for the tab, and informing the user and the merchant of a result of processing the user's payment. In addition, the method comprises delivering chat messages or postings between the user and other users, processing the sending or receiving of an order of a second merchant from or to the user.

BRIEF DESCRIPTION OF THE DRAWINGS

FIG. 3 is a block diagram illustrating an example accounts database.

FIG. 4 is a block diagram illustrating an example offerings database.

FIG. 5 is a block diagram illustrating an example locations database.

FIG. 6 is a block diagram illustrating an example tabs database.

FIG. 7 is a block diagram illustrating an orders database.

FIG. 8 is a block diagram illustrating an example chats database.

FIG. 9 is a block diagram illustrating an example buzz database.

Figure 1:
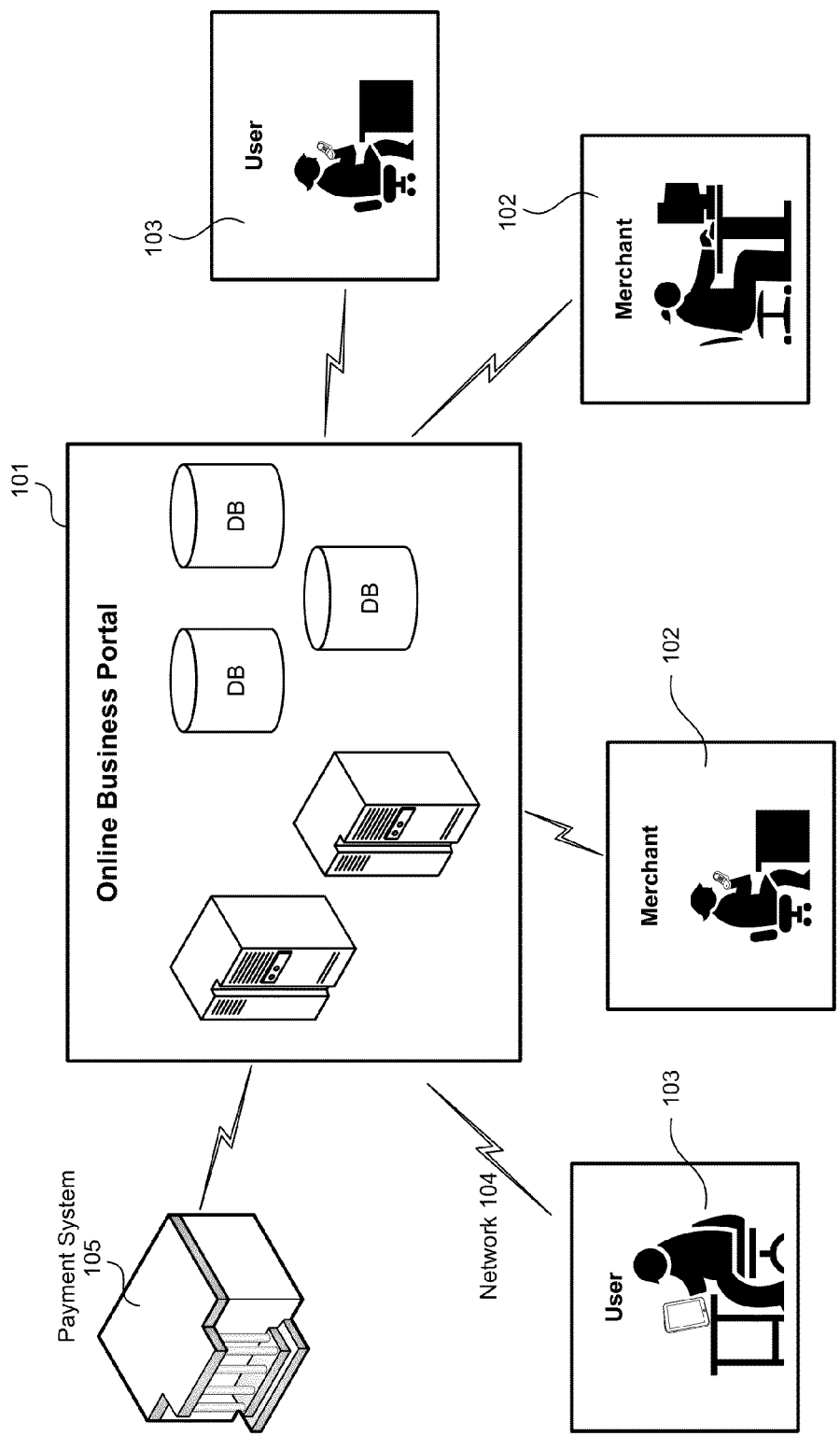
FIG. 1 is a block diagram illustrating an example online environment where embodiments of the present invention can be realized.

The drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments of the present invention. Moreover, while the technologies described are amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAIL DESCRIPTION

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Embodiments of the present invention may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), field programmable gate arrays (FPGAs), application-specific integrated circuits (ASICs), vehicle identity modules (VIMs), magnetic or optical cards, flash memory, or other type of media/machine-readable medium suitable for storing electronic instructions.

Moreover, embodiments of the present invention may also be downloaded as a computer program product or data to be used by a computer program product, wherein the program, data, and/or instructions may be transferred from a remote computer to a requesting computer by way of data signals embodied in a carrier wave or other propagation medium via a communication link (e.g., a modem or network connection). For some parts of the program, data or instructions, this communication link may include the power transmission facilities ("in-band"). For other parts of the program, data, or instructions, this communication link may include external networks such as the telephony network (e.g., Public Switched Telephony Network, cellular, wifi, and other voice and wireless networks) or the Internet ("out-of-band"). In some cases, the communications link may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

In this description, the phrases "in some embodiments", "according to various embodiments", "in the embodiments shown", "in some embodiments", "in other embodiments", and the like generally mean the particular feature, structure, or characteristic following the phrase is included in at least one embodiment of the present invention and may be included in more than one embodiment of the present invention. In addition, such phrases do not necessarily all refer to the same embodiments.

If the specification states a component or feature "may", "can", "could", or "might" be included or have a characteristic, that particular component or feature is not required to be included or have the characteristic.

The term "module", "engine", "component" or the like refers broadly to general or specific-purpose hardware, software, or firmware (or any combination thereof) components. Modules and engines are typically functional components that can generate useful data or other output using specified input(s). A module or engine may or may not be self-contained. Depending upon implementation-specific or other considerations, the modules or engines may be centralized or functionally distributed. An application program (also called an "application") may include one or more modules and/or engines, or a module and/or engine can include one or more application programs.

Various embodiments and implementations of an online management portal will now be described. The following description provides specific details for a thorough understanding and an enabling description of these implementations. One skilled in the art will understand, however, that the invention may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the invention.

FIG. 1 is a diagram illustrating an example online environment where embodiments of the present invention can be realized. Participants in the online environment include one or more merchants 102 and one or more users 103. The participants interact with an online management portal 101 across networks 104 through their respective client devices, e.g. a mobile device, a desktop computer, and a wearable device. The online management portal 101 works with one or more external payment systems 105 sitting across a network, such as banks, credit card companies, bitcoin organizations and e-commerce companies which process online payments, to handle financial transactions conducted among the participants. In general, the online management portal 101 streamlines the process in which a user visits a merchant's establishment, opens a tab on the merchant, adds orders to the tab, pays for the orders, and closes the tab. It also enables users to socialize online through chats, postings, and sending/receiving gifts or goodies. Various embodiments show that the online management portal 101 allows the merchants 102 to receive payments for their goods and services and allow the users 103 to pay for desired goods and services while socializing with other users in real time with their electronic devices, within a secure and user-friendly environment.

The online management portal 101 may provide various graphical user interfaces. The participants may access these graphical user interfaces and other facilities of the online management portal 101 using client applications (mobile or desktop applications), web browsers (Mozilla Firefox, Google Chrome, and Internet Explorer, etc.), and the like installed on their client devices.

Figure 2:
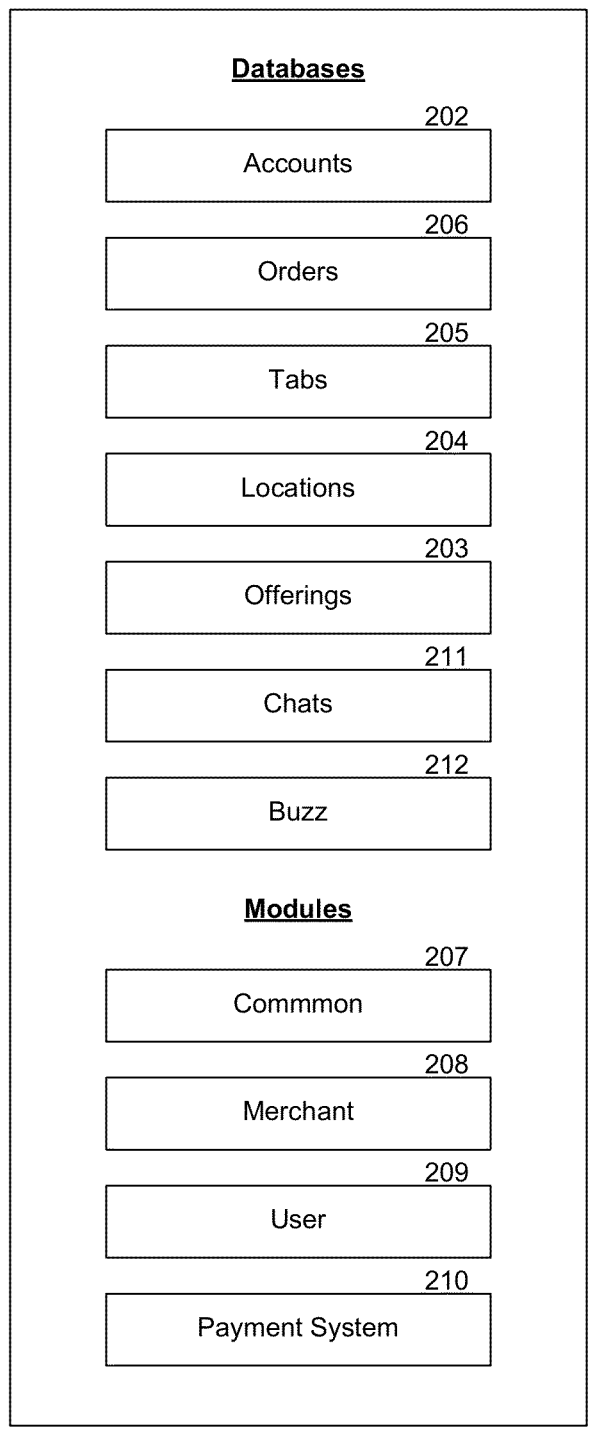
FIG. 2 is a block diagram illustrating example components of an online management portal.

FIG. 2 is a block diagram illustrating example components of the online management portal 101. In some embodiments, the online management portal 101 comprises a number of databases, including an accounts database 202, an offerings database 203, a locations database 204, an orders database 206, a tabs database 205, a chats database 211 and a buzz database 212. The accounts database 202 contains basic information regarding each participant. The locations database 204 tracks a user's visits to the merchants' establishments. The offerings database 203 contains information regarding each item offered by a merchant for purchase. The tabs database 205 stores information regarding each tab opened by a user on a merchant. The orders database 206 stores information regarding each order placed on a tab. The chats database 211 stores chat messages exchanged between users. The buzz database 212 stores postings created by users.

In some embodiments, the online management portal 101 also comprises a number of modules, including a common module 207, a merchant module 208, a user module 209, and a payment system module 210. The common module 207 has components that are generally accessible to all the participants, such as registration, login/logout, getting a list of merchants, and getting a list of users. The merchant module 208 has components available to the merchants, such as examining a list of tabs opened by the users, managing a list of deals, reviewing the list of goodies served and determining its income over specific timeframes. The user module 209 has components available to the users, such as managing a list of tabs on the merchants and sending or receiving goodies. The payment system module 210 communicates with external payment systems 105 to handle details of user payments. The online management portal 101 may additionally comprise a point-of-sale (POS) system module for communicating with external POS systems to eliminate the processing of individual orders.

FIG. 3 is a diagram illustrating an example accounts database 202. In some embodiments, the accounts database 202 contains the illustrated fields, with one record for each participant. The username field 301 and the password field 302 are used for controlling the participant's access to the online management portal 101. The role field 306 indicates whether the participant is a merchant or a user. Additional data regarding the participant, such as the name, the nickname, a photo, a physical address, an email address, a phone number, the birthday or creation date, active or operating hours and favorite items are also maintained in the accounts database 202.

In some embodiments, the online management portal 101 stores the terms of service specified by or agreed to by the participant in the "terms of service" field 304. The terms of service may include various rules on the use of tabs, such as the number of open tabs, the maximum amount of a tab, the maximum duration before a tab is closed, etc. They could also specify various fees, such as payment system transaction fees, service surcharges, and so on. The online management portal 101 also stores privacy settings specified by the participant in the "privacy settings" field 308. The privacy settings may apply to various aspects of a participant's interactions with other participants. They may control the visibility of a user's name, photo, current location, past visits of merchant establishments, order history, chat messages, postings, and so on within certain time periods and with respect to certain other participants. In addition, the online management portal 101 manages money transfers through external payment systems using information stored in the "payment system credential" field 303. For example, this field may contain encrypted information regarding a participant's account with a credit card company, a bank, a bitcoin network, an e-commerce company that manages online and mobile payments and other payment systems.

In some embodiments, the online management portal 101 stores a list of friends or buddies designated by a participant, normally a user, in the "buddies" field 307. Participants who are buddies may enjoy certain privileges in interacting with one another. As one example, some of the privacy settings, such as restrictions on viewing a participant's location information, may be relaxed or removed for the participant's buddies. As another example, chats with a buddy may take place whenever both parties are logged in, while chatting with any other participant may be permitted only when both parties are in the same merchant's establishment. The online management portal 101 also stores the number of chips or credits in the "chips" field 309. It may allow a user to earn these credits in various ways, including signing up, recommending others to sign up, and spending above a threshold. It may also allow a user to redeem these credits and use the redeemed amount as any form of payment.

FIG. 4 is a diagram illustrating an example offerings database 203. In some embodiments, the offerings database 203 contains the illustrated fields, with one record for each offering by a merchant. Information identifying the offering, such as the description and the merchant is stored in the offerings database 203. Additional data regarding the offering, including the regular price and the quantity available, are also maintained in the database. The merchant may decide to have sales or other deals on certain offerings. Accordingly, the online management portal 101 uses the "deal price" field 401 and "deal end date" field 402 to show the deal price and effective period.

FIG. 5 is a diagram illustrating an example locations database 204. In some embodiments, the locations database contains the illustrated fields, with one record for each stay by a user at a merchant's establishment. Information identifying the user and the merchant is stored in the locations database 204. The merchant's establishment can be a brick-and-mortar store, a website, and so on. The "location ID" field 501 corresponds to the location of the merchant's establishment, which can be represented as a physical address, a uniform resource locator (URL), and so on. The date and time when the stay begins or ends are also maintained in the locations database 204.

FIG. 6 is a diagram illustrating an example tabs database 205. In some embodiments, the tabs database 205 contains the illustrated fields, with one record for each tab opened by a user on a merchant. Information identifying the user and the merchant is stored in the tabs database 205. Information regarding a server and a table at the merchant's establishment that are associated with the tab, the total amount of the tab, the corresponding tax amount, and the tip amount are also stored in the tabs database 205. The "open date" and "close date" indicates the dates the tab is opened and closed, respectively. For example, a tab may be opened a bit before midnight and closed the next morning. The tab can be in one of several states, such as those enclosed in parentheses in the next paragraph, and the current state is stored in the state field 601.

Typically, upon arriving at a merchant's establishment, a user may ask the merchant to open a tab ("opening-requested") verbally or via their mobile device. In response to the user's request, the merchant may open a tab for the user ("opened"). The user or the merchant may then add one or more orders to the tab. When the user is ready to close the tab, the user may request the check ("closing-requested"), in response to which the merchant may send the check including the total amount on the tab to the user. The user may then make a full payment plus tax, tips and a transaction fee ("paid"), thereby completing a transaction ("closed"), and leave the merchant's establishment. It is possible that the user's attempted payment fails, as a result of a credit rejection from the user's credit card company, for example ("insufficient funds"), in which case the user is expected to provide further payment later, by using another credit card, for example. It is also possible that the user leaves the merchant's establishment without requesting a check or making any payment ("walkout"). If the full payment is not made within a predetermined period of time according to the terms of service, an amount in escrow or on hold may be transferred to an account associated with the online management portal 101, a previously-chosen payment method may be put through or the amount owed may be subject to collection, as per the terms of service.

FIG. 7 is a diagram illustrating an example orders database 206. In some embodiments, the orders database 206 contains the illustrated fields, with one record for each order. The orders database contains a "tab ID" field 704 identifying a tab to which the order is added. It is possible that an order is not associated with a tab, such as a quick order that allows an order to be processed quickly and an order of a goodie. In that case, the tab ID field would be left empty. Information regarding the order, including the item ordered and the price of the item, is stored in the orders database 206. The orders database 206 also includes a "recipient ID" field 706 holding information identifying the recipient of the item, as the item ordered may be intended for another user as a goodie. This may happen when a first user at a merchant's establishment offers a goodie to a second user at the same location or to a buddie of the first user at any location. The orders database 206 further includes a "placement date" field 708 and a "redemption date" field 710 indicating when the order is placed and redeemed, respectively. These two fields may contain different dates when, for example, a first user offers a goodie to a second user on a first date (placement date) and the second user redeems the order a few days later on a second date (redemption date).

FIG. 8 is a diagram illustrating an example chats database 211. In some embodiments, the chats database 211 contains the illustrated fields, with one record for each chat message from a sender participant to one or more recipient participants. The chats database 211 includes a "sender" field 805 and a "list of recipients" field 810 holing information identifying the sender and the list of recipients, respectively. Information regarding the time of message delivery, and the message content, which may contain text, images, videos or multimedia, is also stored in the chats database 211. Generally, participants who are logged in may engage in private chat sessions by sending chat messages regardless of where they are located.

FIG. 9 is a diagram illustrating an example buzz database 212. In some embodiments, the buzz database contains the illustrated fields, with one record for each posting made by a participant, typically a user, to a group of other participants. The reference field 905 is left empty when the posting is original and may serve as the beginning of a thread or contains the ID of another posting when it is a response to that posting. Information identifying the author, the time of posting delivery, and the posting content is also stored in the buzz database 212. The buzz database 212 also contains a permissions field 910 indicating which participants can view the posting and is set to the list of the author's buddies by default. Generally, a participant may create or respond to a posting and specify who is able to view the posting.

Figure 10:
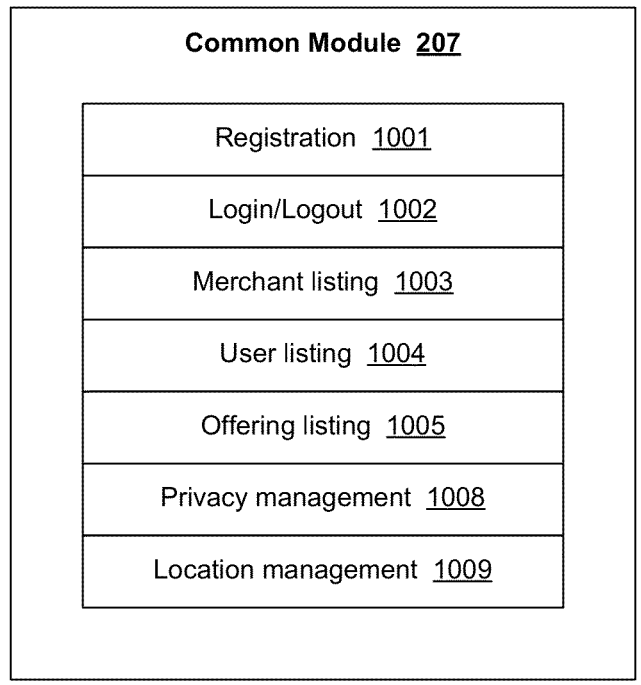
FIG. 10 is a block diagram illustrating example components of a common module.

FIG. 10 is a block diagram illustrating example components of the common module 207. In some embodiments, the registration component 1001 accepts certain information from a party, such as the types of information contained in the accounts table 202, and sets up an account for the party to make the party a participant in the online environment. The information can be submitted directly by the party, by a merchant on behalf of a user, and so on. The registration component 1001 also accepts the same types of information from a participant as updates to the participant's account. The login/logout component 1002 allows a participant to enter the online environment by providing the appropriate credentials, such as a user name and a password stored in the accounts database 202, and exit the online environment afterwards. It also provides a logged-in user with an identifying, secure token for carrying out transactions in the online environment. The location management component 1009 sets and unsets a user's location to the address of a merchant's establishment. It may do so according to the user's or the merchant's instructions or based on the user's location coordinates obtained from an external GPS system. It also indicates whether the user is checked into or out of the merchant's establishment.

In some embodiments, the merchant listing component 1003 provides a participant with a list of merchants currently operating in the online environment, indicating the name, address, and business hours for each merchant as stored in the accounts database 202, for example, subject to the privacy settings. A user can sort, search and otherwise use this list to decide whether and when to visit certain merchants' establishments, and a merchant can sort, search and otherwise use this list to identify the competitors and refine its sales and marketing strategies, for example. The user listing component 1004 provides a participant with a list of users currently logged into the online environment, indicating the name, photo, and birthday for each user as stored in the accounts database 202 as well as the current location, for example, subject to the privacy settings. A user can sort, search and otherwise use this list to locate the user's buddies and meet other users online, and a merchant can sort, search and otherwise use this list to analyze its customer base and adjust its sales and marketing strategies, for example.

In some embodiments, the offering listing component 1005 provides a participant with a list of offerings, indicating a description, the merchant providing the offering, the regular price, and the deal information as indicated in the offerings database 203, for example. A user can sort, search and otherwise use this list to decide whether to visit certain merchant's establishments or whether to catch certain deals, and a merchant can sort, search and otherwise use this list to revise its sales and marketing strategies. It is also possible for the common module 207 to have a privacy management component 1008 to manage and enforce privacy policies in accordance with the privacy settings in the online environment.

Figure 11:
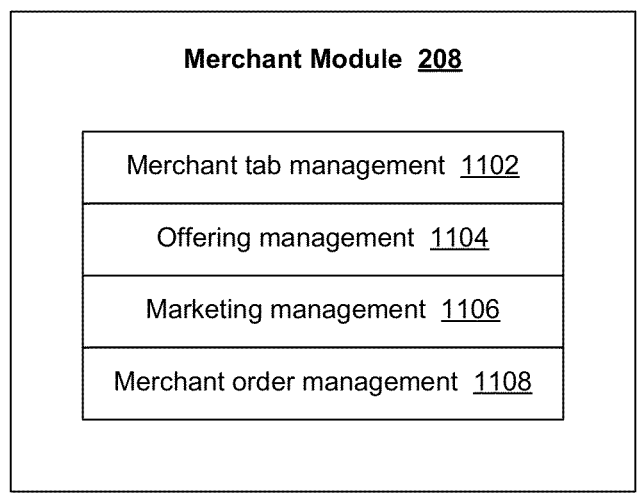
FIG. 11 is a block diagram illustrating example components of a merchant module.

FIG. 11 is a block diagram illustrating example components of the merchant module 208. In some embodiments, the merchant tab management component 1102 allows a merchant to access a user's tab on the merchant. It allows the merchant to set the tab to one of a certain set of states, which can be larger or smaller in other embodiments. As one example, when the user walks out of the user's establishment without requesting a check, the merchant would want to put the tab in the "walkout" state. The merchant tab management component 1102 may automatically put the tab in the "insufficient fund" state when the user is unable to furnish the full payment or allow the merchant to do so. It may also automatically put the tab in the "paid" state when the user's method of payment to the merchant is verified by the external payment system 105 and subsequently in the "closed" state, or it may allow the merchant to do so. In addition, the merchant tab management component 1102 allows a merchant to accept a specification of a payment method and submit a payment request for processing. The merchant tab management component 1102 also provides the merchant with a list of tabs, indicating all possible information regarding each tab as stored in the tabs database 205. The merchant can sort, search and otherwise use this list to identify the number of tabs in a certain state, calculate its potential income and actual income, identify high-spending and frequent-visiting customers, and otherwise manage its business activities, for example.

The merchant order management component 1108 allows a merchant to add orders to and remove orders from a tab. In addition, it allows a merchant to place an order that may not be associated with any tab, such as a quick order or an order of a goodie, and in turn it requests a check for the order. The merchant order management component 1108 also provides a merchant with a list of orders placed by its customers for themselves or for other users, indicating all possible information regarding each order as stored in the orders database 206. The merchant can sort, search and otherwise use this list to identify popular offerings within various timeframes, identify popular gift choices, characterize typical gift senders and recipients, calculate typical tip amounts, and otherwise manage its business activities. Through the offering management component 1104, a merchant may set the regular price for each of its offerings. It may also offer a sale price for one or more of the offerings, using a variety of rules. One rule could be based on the quantity of an item sold so far or within a certain period of time. Another rule could involve the current total income. Yet another rule could be seasonable in nature.

The marketing management component 1106 allows a merchant to design and implement marketing strategies based on the information generated by the other components. In addition to sending periodic notices on current deals to all the participants or those who have opted in, the merchant can deliver customized, targeted marketing blasts. As one example, if a user tends to purchase items in the same category, the merchant may inform the user specifically of new offerings or deals on offerings in that category. On the other hand, if a user tends to make more purchases in certain months, the merchant may present the user with more, bigger deals in the other months. As another example, a merchant may send information on deals and promotions to the list of users who are in the same neighborhood as the merchant's establishment to attract them to the merchant's establishment.

Figure 12:
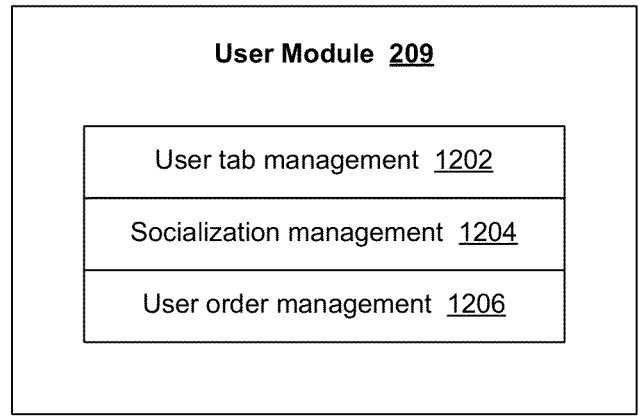
FIG. 12 is a block diagram illustrating example components of a user module.

FIG. 12 is a block diagram illustrating example components of the user module 209. In some embodiments, the user tab management component 1202 allows a user to access the user's tab on a merchant. In some embodiments, it allows a user to set a tab to one or more of a certain set of states, which could be smaller or larger in other embodiments. As one example, a user may want to put a tab in the "check requested" state when the user is ready to review the check and close the tab. In addition, the user tab management component 1202 allows a user to specify a payment method and provide relevant credentials. As one example, the payment method may be a charge to a credit card, and the credentials may comprise a credit card number and a security code. As another example, the payment method may be a transaction through an e-commerce company processing online and mobile payments, and the credentials may comprise an account number and a password. The user tab management component 1202 also provides a user with a list of tabs, indicating all possible information regarding each tab as stored in the tabs database 205. The user can sort, search and otherwise use the list to calculate the number of visits and expenses by merchant within various timeframes, adjust the spending patterns, and otherwise manage the spending activities. The user order management component 1206 allows a user to add orders to and remove orders from a tab. It also allows a user to place an order that may not be associated with any tab, such as a quick order or an order of a goodie, and in turn it requests a check for the order. In addition, it provides a user with a list of items purchased and received by the user, indicating all possible information regarding each order as stored in the orders database 206. The user can sort, search and otherwise use this list to identify frequently ordered items, summarize senders of the gifts received and recipients of the gifts sent, and otherwise manage its order activities.

Furthermore, the socialization management component 1204 enables a user to plan and carry out socializing activities based on information generated by the other components. In some embodiments, it allows a user to invite other users who live in the same neighborhood and have similar active hours for a gathering by sending a group buzz. In addition, users may engage and "chat" with other users who are checked-in to the same venue and offer to send/receive goodies, including drinks or eats, to/from each other whether they know each other or not. They may do the same as above with their own friends, aka "buddies", who are checked-in at other venues as well. The ordering, delivery and receipt of goodies may happen in real time.

Figure 13:
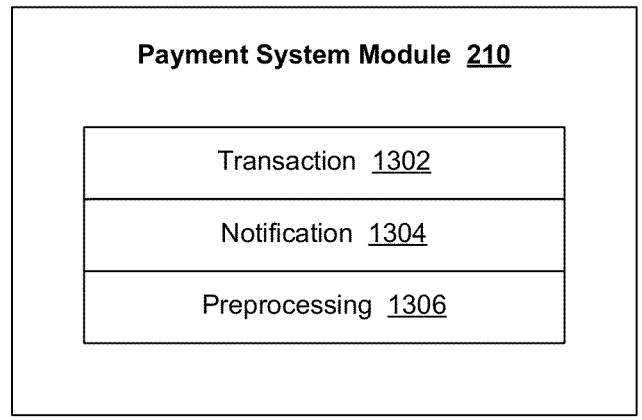
FIG. 13 is a block diagram illustrating example components of a payment system module.

FIG. 13 is a block diagram illustrating example components of the payment system module 210. In some embodiments, the preprocessing component 1306 verifies a user's payment mechanism and possibly reserves a fund for future expenses. As one example, it may verify the user's bank account number, withdraw a reasonable amount of money, and place it in an escrow account. As another example, it may verify the user's credit card number and place a hold on the user's credit card for a reasonable amount. The transaction component 1302 allows a user to pay the user's tab on a merchant. As one example, it may submit the amount of the tab to the user's credit card company. As another example, it may carry out a transfer of the tab amount between the user's bank and the merchant's bank. The notification module 1304 reports the result of a user's attempted payment, which can be charge accepted, credit limit reached, insufficient fund, or invalid credit card, for example.

Figure 14:
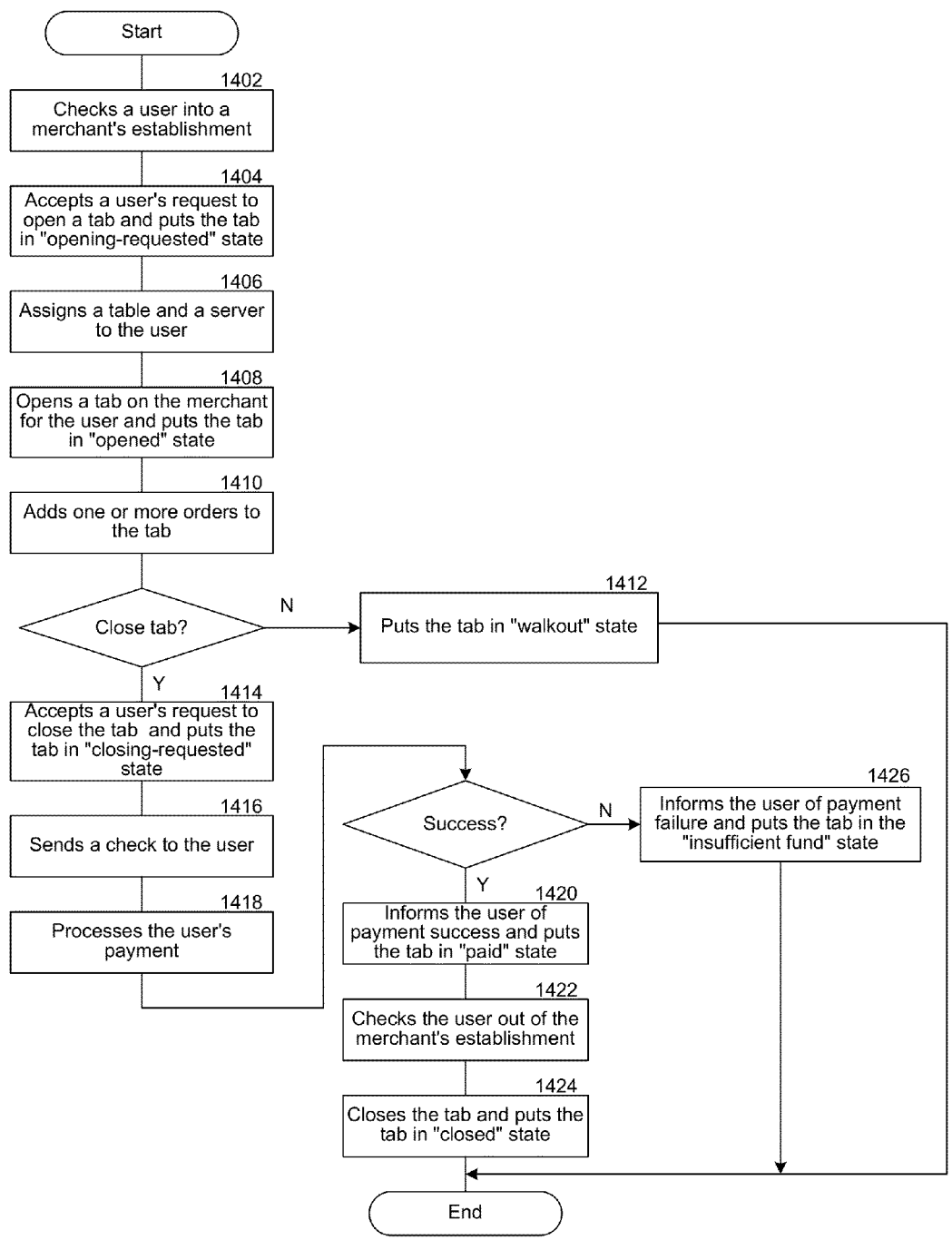
FIG. 14 is a flowchart illustrating an example process of tab management.

FIG. 14 is a flowchart illustrating an example process of tab management. In some embodiments, the location management component 1009 updates a user's location and records the time of entry as the user enters a merchant's establishment in 1402. The user tab management component 1202 submits a request to the merchant to open a tab according to a user's instruction and puts the tab in the "opening-requested" state in 1404. At that point, the preprocessing component 1306 may verify the user's payment mechanism and reserve a fund. If the preprocessing is unsuccessful, the notification component 1304 may display an error message indicating the failure of opening a tab. If the preprocessing is successful or in the absence of any preprocessing, the merchant tab management component 1102 assigns a table and a server to the user according to a merchant's instruction in 1406.

Figure 15:
FIG. 15 is a user interface diagram illustrating an example overview screen for the merchant to manage tabs and goodies.

FIG. 15 is a user interface diagram illustrating an example overview screen for the merchant to manage tabs and goodies. The overview screen indicates, in an example color-coding scheme, the number of requests received to open a tab (in this case one) in 1506 in a yellow background, the number of open tabs in 1504 (in this case one) in a green background, the number of checks requested in 1502 (in this case one) in a red background, and the number of goodies ordered in 1508 (in this case zero) in a blue background. The overview screen also shows one icon with a yellow border corresponding to the user who has requested to open a tab in 1514, one icon with a green border corresponding to the user who has an open tab in 1512 and an icon with a red border corresponding to the user who has requested his or her check in 1510. Each icon includes the name and the photo as well as information identifying the server, the table and the check assigned to the user when available, as indicated in 1510. It may include further details about the user, such as information regarding the favorite drink or the favorite waiter, any requests the user has made (to open/close a tab, for example), and any goodies received by the user. In this example, when a user works with a tab, the user's icon would go through the yellow state, the green state and the red state, in that order. When a user places a quick order, for example, the user's icon may bypass the yellow and green states.

Figure 16:
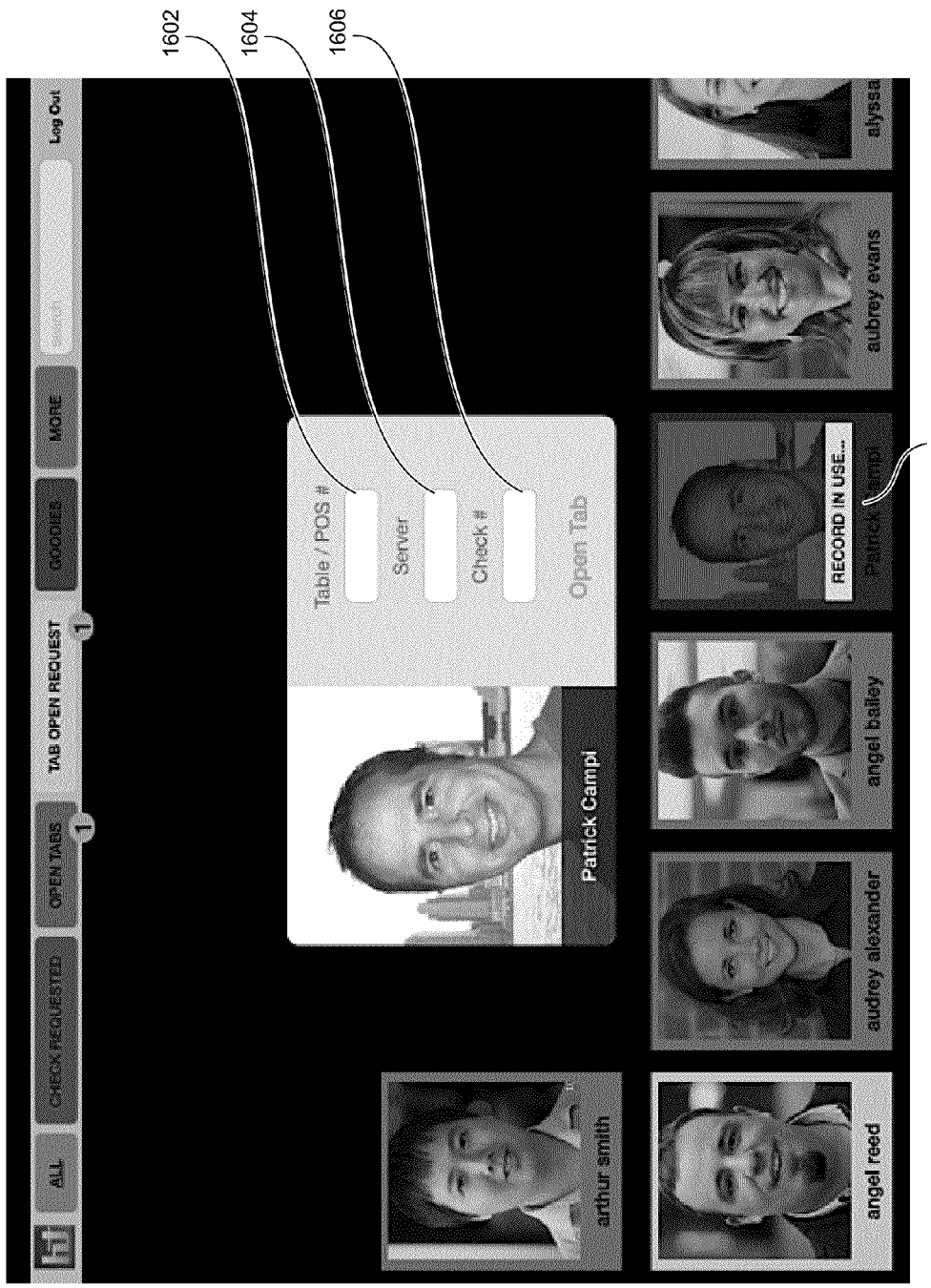
FIG. 16 is a user interface diagram illustrating an example "open tab" screen for the merchant to respond to a user's request to open a tab.

FIG. 16 is a user interface diagram illustrating an example "open tab" screen for the merchant to respond to a user's request to open a tab. The "open tab" screen is overlaid on the overview screen, and it may be presented when the merchant clicks on an icon of a user, here shown as 1608, who has made a request to open a tab. It allows the merchant to assign a table and a server to the user in 1602 and 1604, respectively. It also allows the merchant to specify a check number in 1606 when synchronization with an external POS apparatus is required, for example. These features allow the merchant to quickly detect and attend to the needs of its customers.

Referring back to FIG. 14, the merchant tab management component 1102 opens a tab on the merchant for the user and puts the tab in the "opened" state in 1408. Next, the user tab management component 1202 or the merchant tab management component 1102 adds orders to the tab according to the user's instruction or the merchant's instruction, respectively, in 1410. At that point, if the user walks out of the merchant's establishment without making a payment, the merchant tab management component 1102 puts the tab in the "walkout" state in 1412. Otherwise, the user tab management component 1202 submits a request to close the tab to the merchant according to a user's instruction and puts the tab in the "closing-requested" state in 1414. The merchant tab management component 1102 then generates a check for the user's tab according to the merchant's instruction in 1416. Instead of responding to a request from the user tab management component 1202, the merchant tab management component 1102 may also generate a check directly, in response to a user's verbal request, for example. In a scenario which relies on an external POS apparatus at a merchant's establishment, the online management portal 101 would not process orders from a user or a merchant, but the POS system module would obtain a check total from the external POS apparatus and send that amount to the merchant and the user. In a quick order scenario, after the location management component 1009 checks a user into a merchant's establishment, the user order management component 1206 may place a quick order and request a check for the order, for example.

Figure 17:
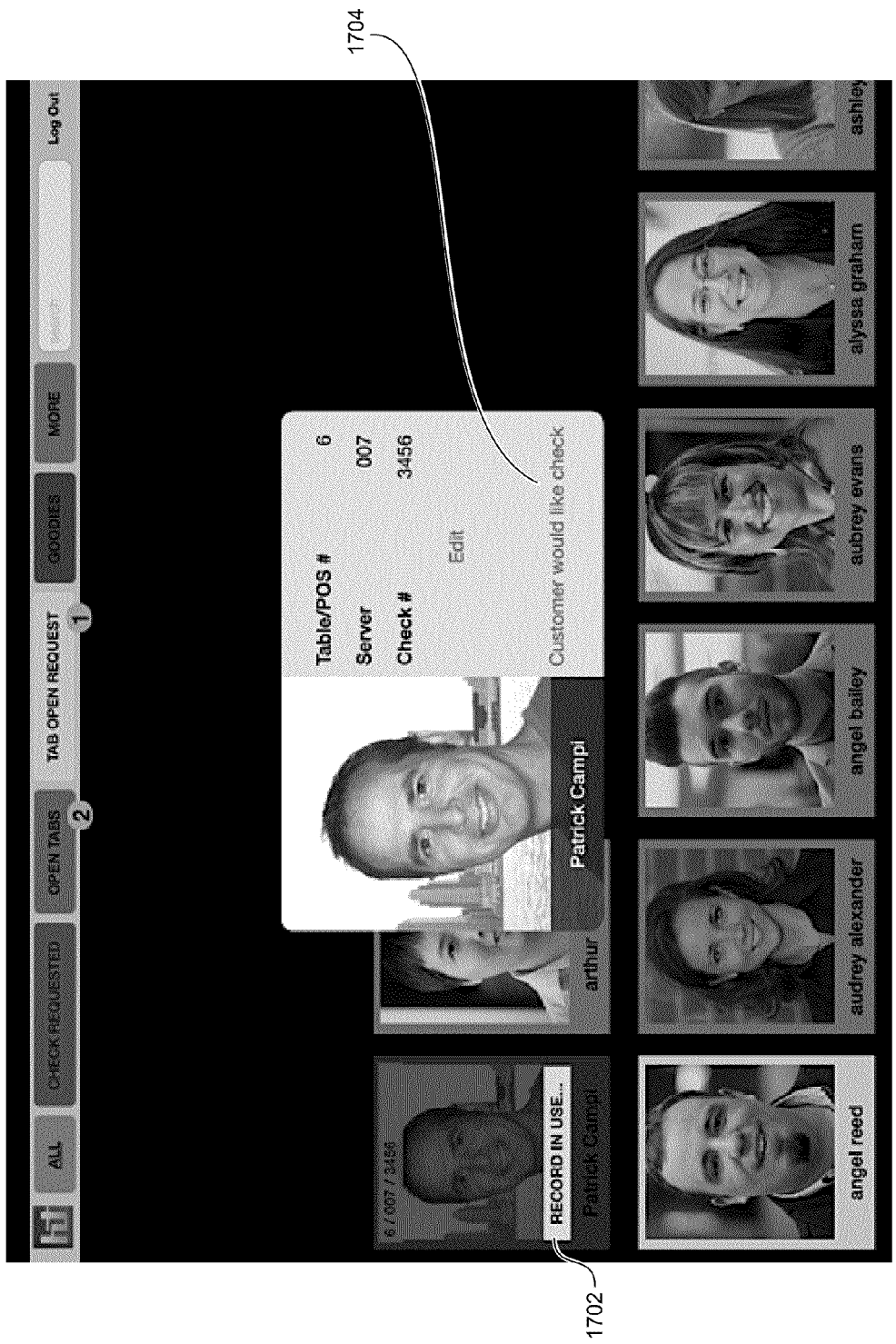
FIG. 17 is a user interface diagram illustrating an example "request check" screen for the merchant to generate a check for a user.
Figure 18:
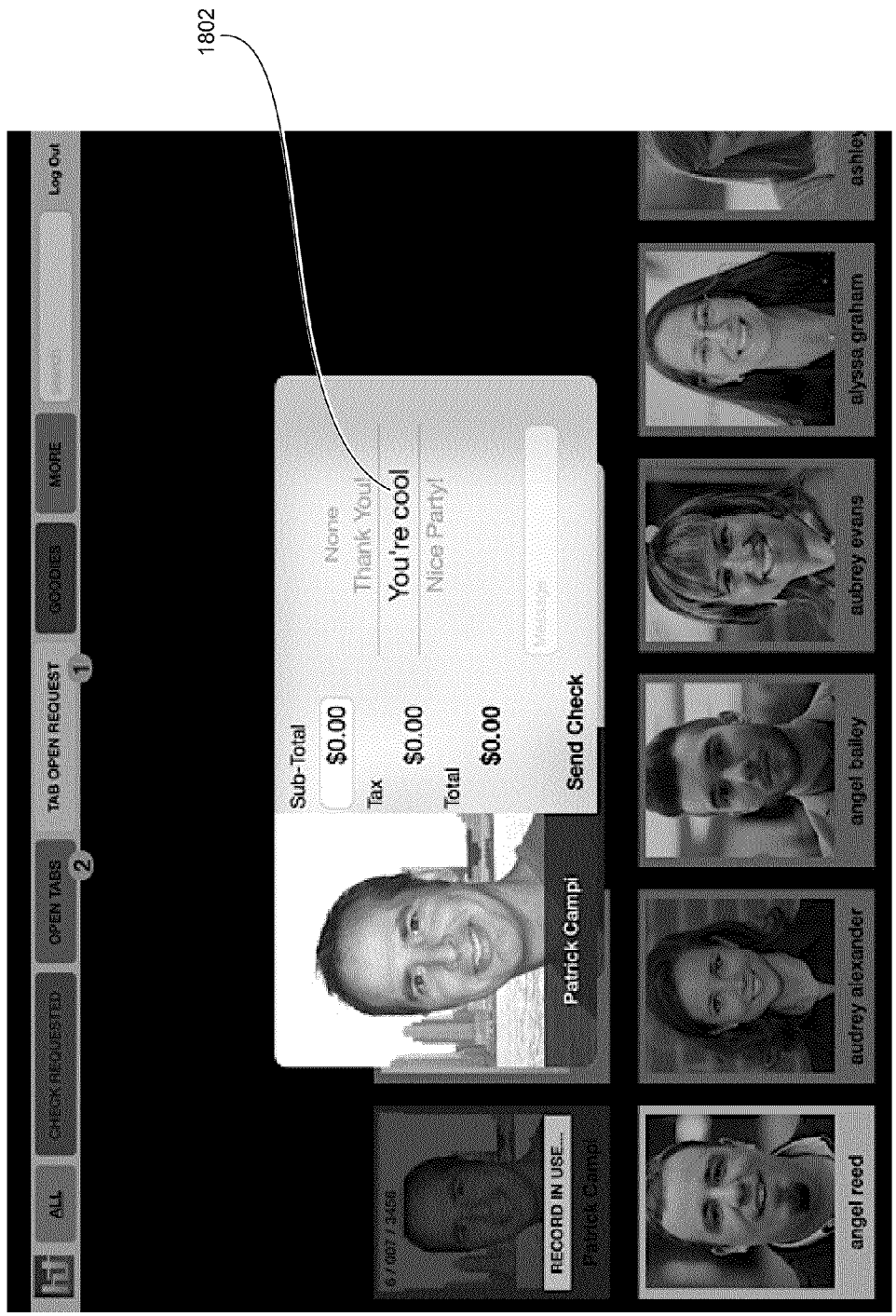
FIG. 18 is a user interface diagram illustrating an example "send check" screen for the merchant to send a check to the user.
Figure 19:
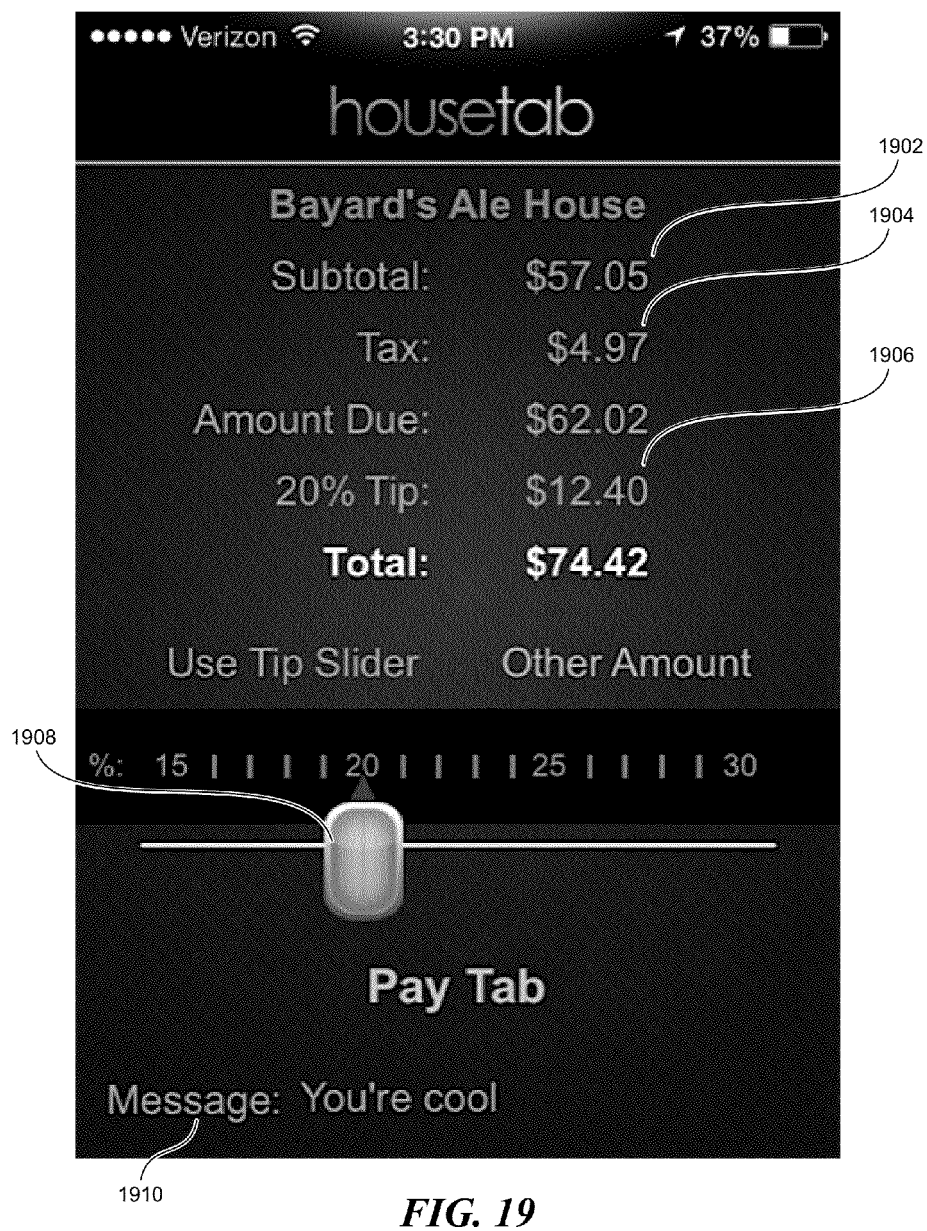
FIG. 19 is a user interface diagram illustrating an example "pay tab" screen for the user.

FIG. 17 is a user interface diagram illustrating an example "request check" screen for the merchant to generate a check for a user, in response to a verbal request from the user. The "request check" screen is overlaid on the overview screen, and it may be presented when the merchant clicks on an icon of a user who has an open tab, here shown as 1702. It allows the merchant to indicate that a check should be generated for the user in 1704. FIG. 18 is a user interface diagram illustrating an example "send check" screen for the merchant to send a check to the user. The "send check" screen is overlaid on the overview screen, and it may be presented in response to the merchant's submitting the information on the "request check" screen illustrated in FIG. 17. It may also be presented when the merchant clicks on an icon of a user who has requested a check to close a tab. It allows the merchant to specify a message for the user to be delivered together with the check in 1802. FIG. 19 is a user interface diagram illustrating an example "pay tab" screen for the user. The "pay tab" screen may be presented in response to the merchant's submitting the information on the "send check" screen illustrated in FIG. 18. It allows the user to review the price of the orders on the tab in 1902 and the tax amount in 1904. It also allows the user to specify the tip amount by adjusting the percentage sliding scale in 1908 and shows the resulting tip amount in 1906. In addition, it displays the message entered by the merchant before sending the check in 1910. By virtue of these features, the user does not have to wait for the merchant to physically serve the check and process the user's payment by swiping the user's credit through a credit card reader, for example, and the merchant additionally does not have to wait for the user to determine the payment method, calculate the tip amount, and sign the check.

Referring back to FIG. 14, the transaction component 1302 processes the user's payment covering the check total, tax and gratuity according to the user's instruction in 1418. If the payment processing is successful, the notification component 1304 informs the user of the success, and the user tab management component 1202 then puts the tab in the "paid" state in 1420. When the user leaves the merchant's establishment, the location management component 1009 updates the user's location and records the time of departure in 1422. Afterwards, the user tab management component 1202 puts the tab in the "closed" state in 1424. If the payment processing is unsuccessful, the notification component 1304 informs the user of the failure and puts the tab in the partially-paid or "insufficient fund" state in 1426. In that case, the user generally needs to make another attempt to pay before the tab can be closed.

Figure 20:
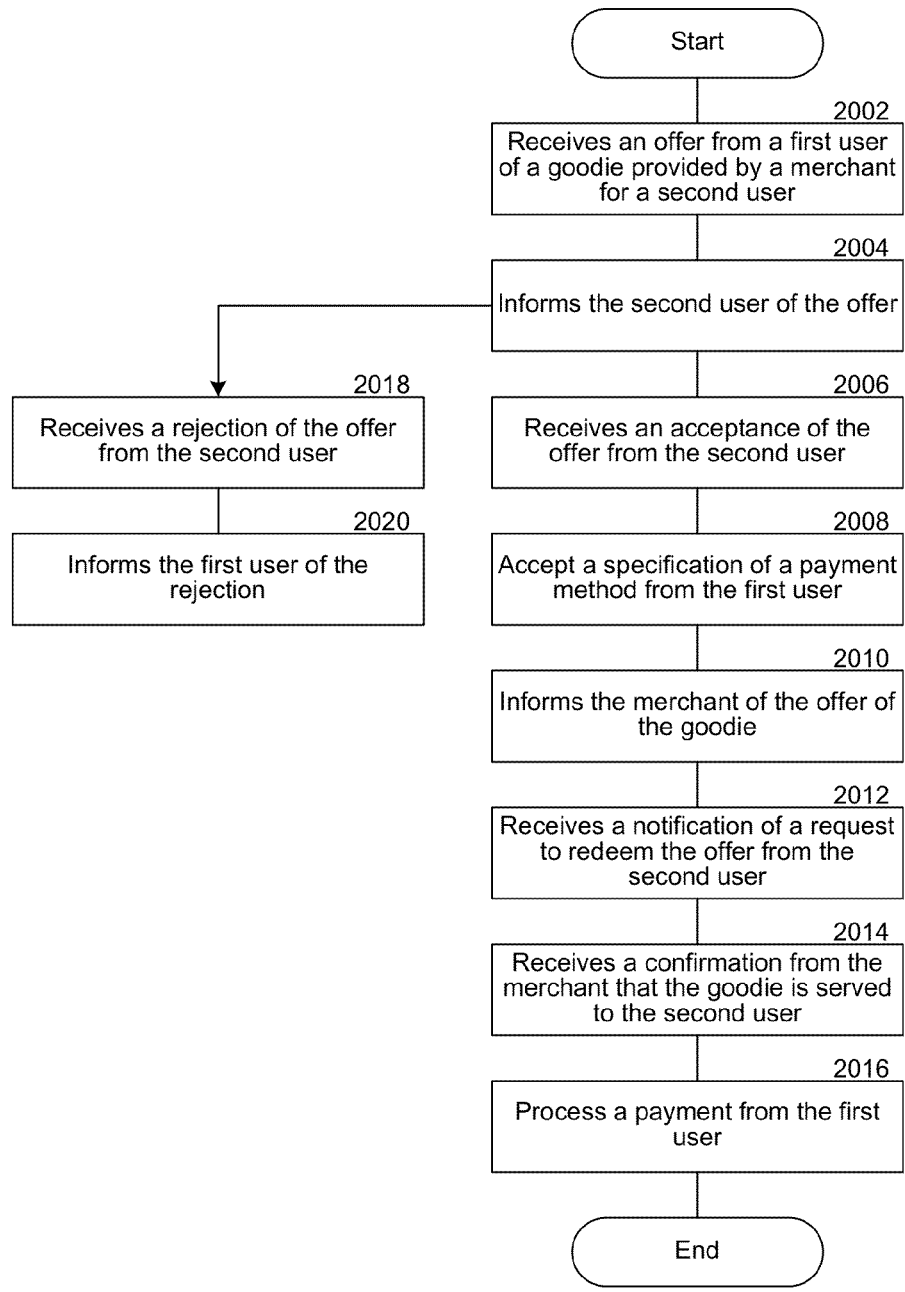
FIG. 20 is a flowchart illustrating an example process of goodie management.

FIG. 20 is a flowchart illustrating an example process of goodie management. In some embodiments, the online management portal 101 receives an offer from a sender user of a goodie provided by a merchant to a recipient user in 2002. It then informs the recipient user of the offer in 2004. Next, the online management portal 101 may receive an acceptance of the offer from the recipient user in 2006. In that case, it accepts a specification of a method of paying for the offer in 2008. It may verify the payment method. It may further use the payment method to deposit a certain amount of money in an escrow account or place a hold on a certain amount of money, for example. Next, the online management portal 101 may inform the merchant of the pending order in 2010. Subsequently, it may receive a notification from the merchant of a request to redeem the offer by the recipient user in 2012.

Figure 21:
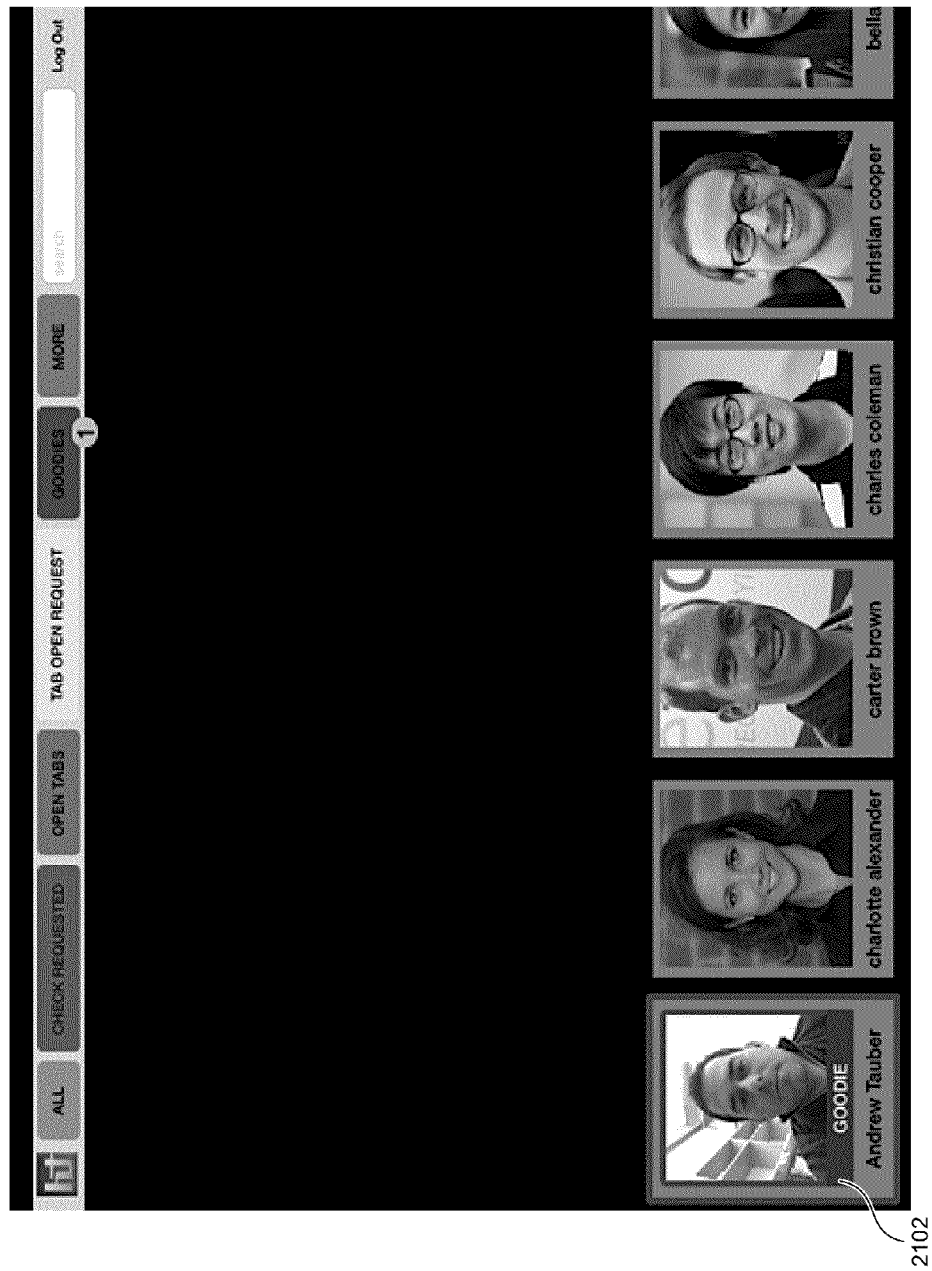
FIG. 21 is a user interface diagram illustrating an example overview screen for the merchant to manage tabs and goodies.
Figure 22:
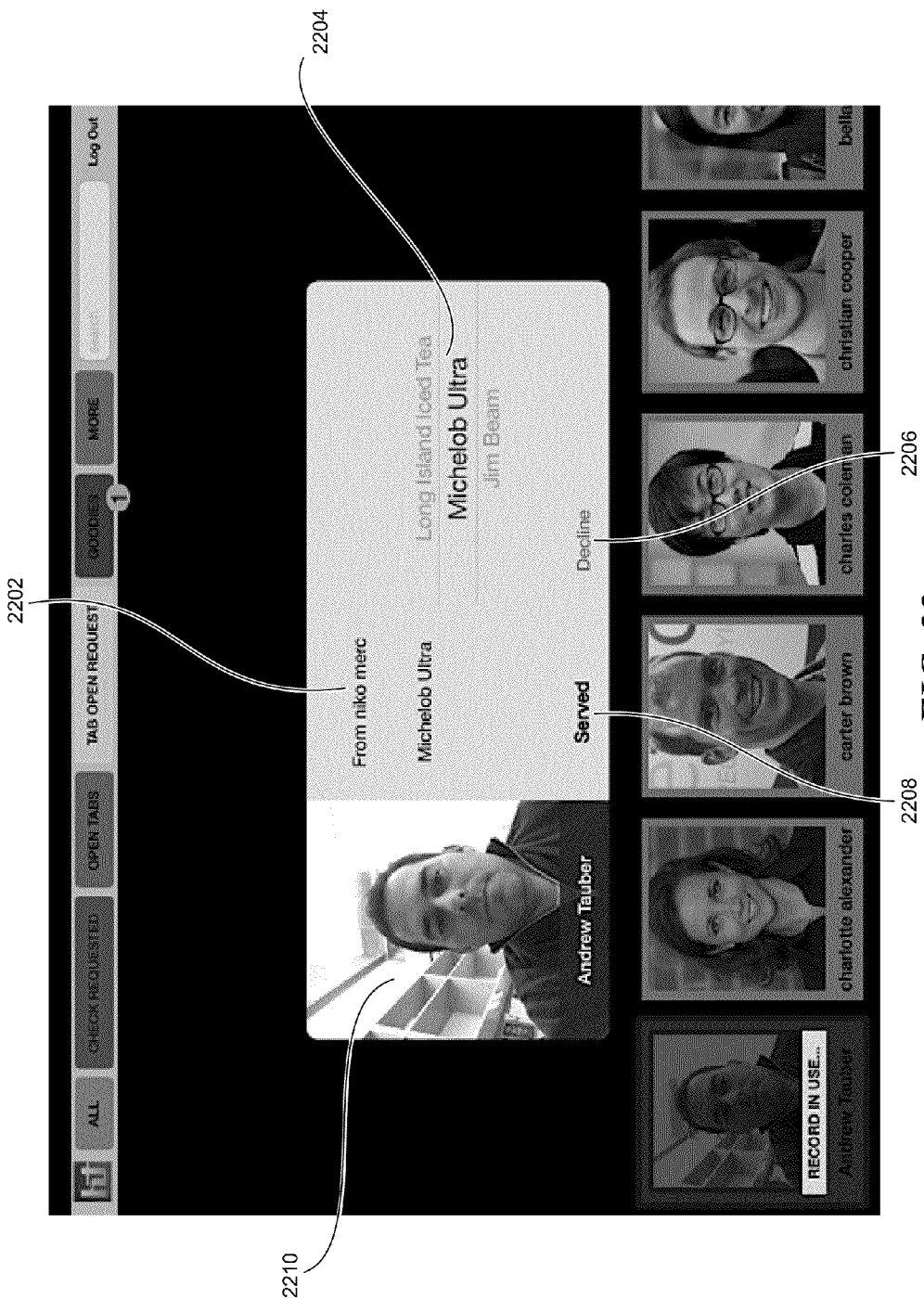
FIG. 22 is a user interface diagram illustrating an example "request to receive goodie" screen for the merchant to process the request.

FIG. 21 is a user interface diagram illustrating an example overview screen for the merchant to manage tabs and goodies. The overview screen is similar to the one shown in FIG. 15, except that it shows that one of the users checked into the merchant's establishment has received one or more goodies in 2102. The goodie indicator is displayed as a result of the merchant's being notified that a sender user has submitted an offer to send a goodie to this recipient user who is currently checked in. Typically, the sender user would be a "buddie" of the recipient user or in the same merchant's establishment. FIG. 22 is a user interface diagram illustrating an example "request to receive goodie" screen for the merchant to process the request. The "request to receive goodie" screen is overlaid on the overview screen and may be presented in response to the recipient user's submitting the request to receive the goodie. It shows information regarding the sender recipient in 2202, the recipient user in 2210, and regarding the goodie in 2204. It allows the merchant to serve the goodie to the recipient user in 2208 or decline the request in 2206. These features enhance socialization among users and allow the merchant to facilitate the socialization process.

Referring back to FIG. 20, the online management portal 101 subsequently receives a confirmation from the merchant that the goodie is served to the recipient user in 2014. At that point, it processes a payment from the first user in 2016. The processing may involve withdrawing a certain amount of money from the sender user's bank account or charging some money to the sender user's credit card account, for example. It may also involve transferring a certain amount of money in an escrow account to an account associated with the online management portal 101 or releasing a hold on a certain amount of money to be credited to the account associated with the online management portal 101. On the other hand, the online management portal 101 may receive a rejection of the offer from the recipient user in 2018. In that case, it informs the first user of the rejection in 2020.

Figure 23:
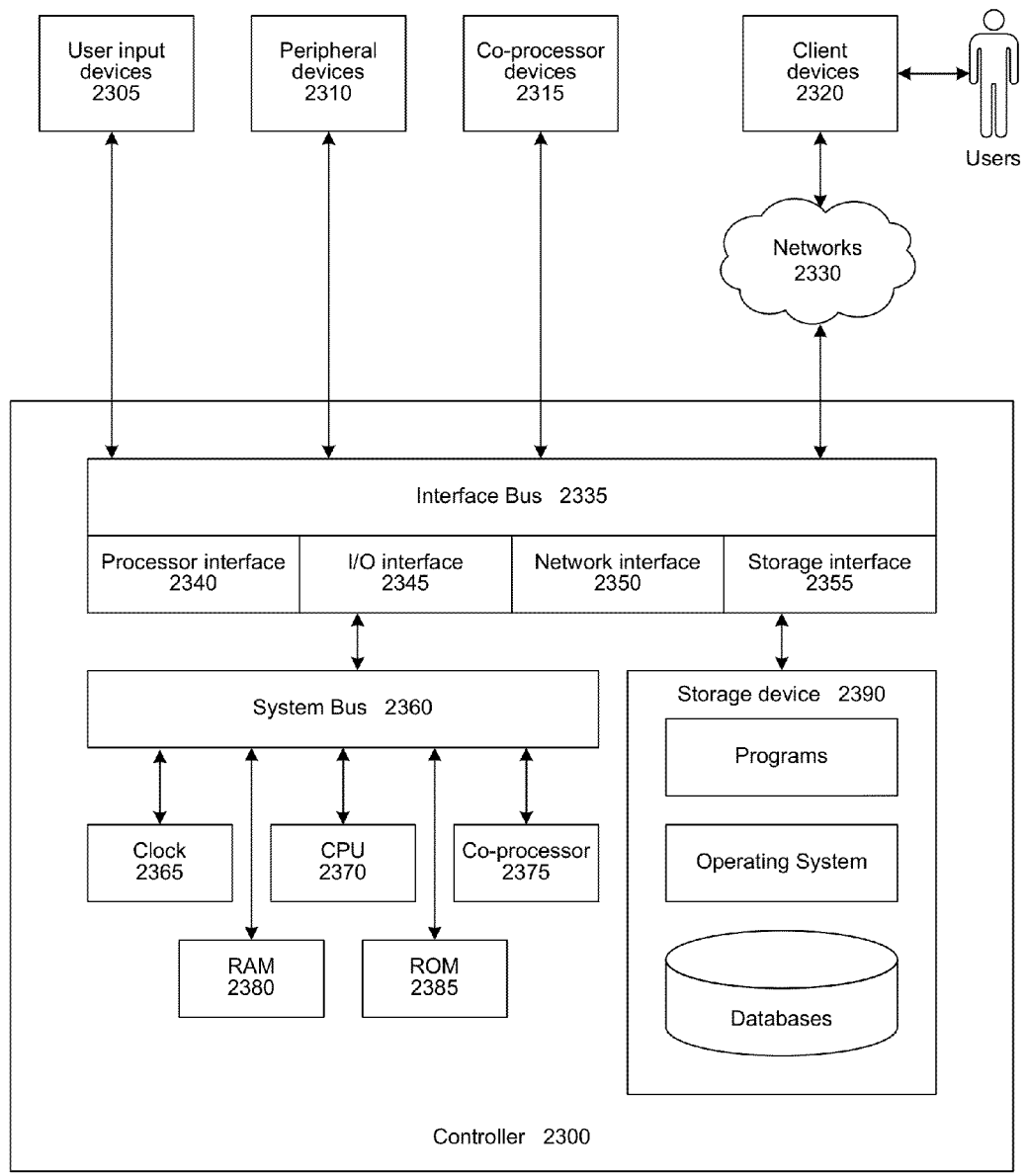
FIG. 23 is a block diagram illustrating an example machine representing the computer systemization of the online management portal as a controller.

Aspects and implementations of the online management portal 101 of the disclosure have been described in the general context of computer-executable instructions, such as routines executed by a general-purpose computer, a personal computer, a server, and/or other computing systems. FIG. 23 is a block diagram illustrating an example machine representing the computer systemization of the online management portal 101 as a controller 2300. The controller 2300 may be in communication with entities including one or more user input devices 2305, peripheral devices 2310, an optional co-processor device(s) (e.g., cryptographic processor devices) 2315 and networks 2330.

Computers employ a central processing unit (CPU) or processor (hereinafter "processor") to process information. Processors may include programmable general-purpose or special-purpose microprocessors, programmable controllers, application-specific integrated circuits (ASICs), programmable logic devices (PLDs), embedded components, combination of such devices and the like. Processors execute program components in response to user and/or system-generated requests. One or more of these components may be implemented in software, hardware or both hardware and software. Processors pass instructions (e.g., operational and data instructions) to enable various operations.

The controller 2300 may include clock 2365, CPU 2370, memory such as read only memory (ROM) 2385 and random access memory (RAM) 2380 and co-processor 2375 among others. These controller components may be connected to a system bus 2360 and through the system bus 2360 to an interface bus 2335. Further, user input devices 2305, peripheral devices 2310, co-processor devices 2315, and the like may be connected through the interface bus 2335 to the system bus 2360. The interface bus 2335 may be connected to a number of interface adapters such as processor interface 2340, input output interfaces (I/O) 2345, network interfaces 2350, storage interfaces 2355, and the like.

Processor interface 2340 may facilitate communication between co-processor devices 2315 and co-processor 2375. In one implementation, processor interface 2340 may expedite encryption and decryption of requests or data. Input output interfaces (I/O) 2345 facilitate communication between user input devices 2305, peripheral devices 2310, co-processor devices 2315, and/or the like and components of the controller 2300 using protocols such as those for handling audio, data, video interface, wireless transceivers, or the like (e.g., Bluetooth, IEEE 1394a-b, serial, universal serial bus (USB), Digital Visual Interface (DVI), 802.11a/b/g/n/x, cellular, etc.).

Network interfaces 2350 may be in communication with the networks 2330. Through the networks 2330, the controller 2300 may be accessible to remote client devices 2320. Examples of networks 2330 include the Internet, Local Area Network (LAN), Metropolitan Area Network (MAN), a Wide Area Network (WAN), wireless network (e.g., using Wireless Application Protocol WAP), a cellular network, a secured custom connection, and the like. The client devices 2320 can include mobile, handheld or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a PDA, a smart phone (e.g., a BlackBerry device such as BlackBerry Z10/Q10, an iPhone, Nexus 4, etc.), a Treo, a handheld tablet (e.g. an iPad, iPad Mini, a Galaxy Note, Galaxy Note II, Xoom Tablet, Microsoft Surface, Blackberry PlayBook, Nexus 7, 10 etc.), a phablet (e.g., HTC Droid DNA, etc.), a tablet PC, a thin-client, a hand held console, a hand held gaming device or console (e.g., XBOX live, Nintendo DS, Sony PlayStation Portable, etc.), mobile-enabled powered watch (e.g., iOS, Android or other platform based), Google Glass, a Chromebook and/or any other portable, mobile, hand held devices, etc. running on any platform or any operating system (e.g., Mac-based OS (OS X, iOS, etc.), Windows-based OS (Windows Mobile, Windows 7, Windows 8, etc.), Android, Blackberry OS, Embedded Linux platforms, Palm OS, Symbian platform, Google Chrome OS, and the like.

Network interfaces 2350 may use various wired and wireless connection protocols such as, direct connect, Ethernet, wireless connection such as IEEE 802.11a-x, and the like. The network interfaces 2350 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand. Other network security functions performed or included in the functions of the firewall, can be, for example, but are not limited to, intrusion-prevention, intrusion detection, next-generation firewall, personal firewall, etc., without deviating from the novel art of this disclosure.

Storage interfaces 2355 may be in communication with a number of storage devices such as, storage devices 2390, removable disc devices, and the like. The storage interfaces 2355 may use various connection protocols such as Serial Advanced Technology Attachment (SATA), IEEE 1394, Ethernet, Universal Serial Bus (USB), and the like.

User input devices 2305 and peripheral devices 2310 may be connected to I/O interface 2345 and potentially other interfaces, buses and/or components. User input devices 2305 may include card readers, finger print readers, joysticks, keyboards, microphones, mouse, remote controls, retina readers, touch screens, sensors, and/or the like. Peripheral devices 2310 may include antenna, audio devices (e.g., microphone, speakers, etc.), cameras, external processors, communication devices, radio frequency identifiers (RFIDs), scanners, printers, storage devices, transceivers, and/or the like. Co-processor devices 2315 may be connected to the controller 2300 through interface bus 2335, and may include microcontrollers, processors, interfaces or other devices.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. The controller 2300 may employ various forms of memory including on-chip CPU memory (e.g., registers), RAM 2380, ROM 2385, and storage devices 2390. Storage devices 2390 may employ any number of tangible, non-transitory storage devices or systems such as fixed or removable magnetic disk drive, an optical drive, solid state memory devices and other processor-readable storage media. They can also include interrelated clusters in a cloud-computing architecture, using technologies such as Amazon Web Services (AWS) and the Hadoop framework. Computer-executable instructions stored in the memory may include the online management portal 101, having one or more components such as routines, programs, objects, data structures, and so on that perform particular tasks or implement particular abstract data types. For example, the memory may contain an operating system (OS) component, program modules, database components, and the like. These components may be stored and accessed from the storage devices, including from external storage devices accessible through an interface bus.

The controller 2300 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of the controller 2300 may be distributed electronically over the Internet or over other networks (including wireless networks). Those skilled in the relevant art will recognize that portions of the online management portal 101 may reside on a server computer, while corresponding portions reside on a client computer. Data structures and transmission of data particular to aspects of the controller 2300 are also encompassed within the scope of the invention.

The above Detailed Description of embodiments of the disclosure is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps or employ systems having blocks, in a different order, and some processes or blocks may be deleted, moved, added, subdivided, combined, and/or modified to provide alternative combinations or sub-combinations. Each of these processes or blocks may be implemented in a variety of different ways. Also, while processes or blocks are at times shown as being performed in series, these processes or blocks may instead be performed or implemented in parallel or may be performed at different times.

In general, the terms used in the following claims should not be construed to limit the disclosure to the specific examples disclosed in the specification, unless the above Detailed Description section explicitly defines such terms. Accordingly, the actual scope of the disclosure encompasses not only the disclosed examples, but also all equivalent ways of practicing or implementing the disclosure under the claims.

From the foregoing, it will be appreciated that specific embodiments of the disclosure have been described herein for purposes of illustration, but that various modifications may be made without deviating from the spirit and scope of the disclosure. Accordingly, the disclosure is not limited.

What is claimed:
1. A device for managing business and social activities for a user in an online environment in which a plurality of users and merchants participate, comprising:
   a logging unit configured to log into or out of the online environment;
   a checking unit configured to check into or out of an establishment of a merchant who is logged into the online environment;
   a tab management unit configured to request to open a tab on the merchant for the user;
   a user listing unit configured to obtain a first list of users who are checked into the merchant's establishment and a second list of users who are logged into the online environment;
   a gift unit configured to send an order of a product of the merchant to one of the first list of users;
   a check handling unit configured to request and receive a check for the tab; and
   a payment unit configured to specify a method of payment for the tab.

2. The device of claim 1, wherein the device is a mobile phone, a tablet, a wearable device, a desktop computer, or a laptop.

3. The device of claim 1, wherein the user listing unit is further configured to obtain a third list of users who are designated as friends of the user and logged into the online environment, indicating whether a user on the third list is checked into an establishment of a merchant who is logged into the online environment.

4. The device of claim 3, wherein the gift unit is further configured to send an order of a product of a merchant to one of the third list of users.

5. The device of claim 1, wherein the gift unit is further configured to receive a notification of an acceptance or a rejection of the order.

6. The device of claim 1, wherein the gift unit is further configured to receive a notification that the user's payment for the order has been processed in response to an acceptance or a redemption of the order.

7. The device of claim 3, wherein the gift unit is further configured to receive an order at a second merchant's establishment from one of the first or third list of users.

8. The device of claim 7, wherein the gift unit is further configured to accept or reject the received order.

9. The device of claim 8, wherein the gift unit is further configured to redeem the accepted order at the second merchant's establishment.

10. The device of claim 1, further comprising a buzz unit configured to send or receive a posting to or from one or more of the first or the second list of users.

11. The device of claim 1, further comprising a quick order unit configured to place an order and request a check for the order.

12. The device of claim 1, wherein the payment unit specifies the method of payment in response to the request to open the tab or the request for the check.

13. A device for managing business and social activities for a merchant in an online environment in which a plurality of merchants and users participate, comprising:
- a logging unit configured to log into or out of the online environment;
- a checking unit configured to receive a notification that a user has checked into or out of the merchant's establishment;
- a user listing unit configured to obtain a first list of users who are checked into the merchant's establishment and a second list of users who are logged into the online environment;
- a marketing unit configured to send a marketing message to the first or the second list of users;
- a tab management unit configured to open a tab on the merchant for the user;
- a gift unit configured to receive a notification that a user has sent an order of the merchant to a second user;
- a check handling unit configured to request and receive a check for the tab; and
- a payment processing unit configured to receive a notification of a result of processing the user's payment for the tab.

14. The device of claim 13,
wherein the user listing unit is further configured to obtain a third list of users who are logged into the online environment and who are in a neighborhood where the merchant's establishment resides, and
wherein the marketing unit is further configured to send a marketing message to the third list of users.

15. The device of claim 13, wherein the tab management unit is further configured to assign a table and a server to the user in response to the notification that the user is checked in or before opening the tab for the user.

16. The device of claim 13, wherein the tab management unit is further configured to obtain a list of tabs on the merchant.

17. The device of claim 13, wherein the gift unit is further configured to accept a redemption of the order for the second user.

18. The device of claim 13, wherein the gift unit is further configured to receive a notification of a result of processing the user's payment for the order.

19. The device of claim 13, further comprising an order unit configured to add orders to the tab.

20. The device of claim 13, further comprising a user interface unit configured to display a number of users who have checked into the merchant's establishment, a number of users who have requested to open a tab, a number of users who have open tabs, and a number of users who have requested a check using different colors.

* * * * *